United States Patent [19]

Mueller et al.

[11] Patent Number: 4,922,944
[45] Date of Patent: May 8, 1990

[54] MELTING SAFETY DEVICE FOR GAS SYSTEM OF HYDROPNEUMATIC PRESSURE ACCUMULATORS

[75] Inventors: Matthias Mueller, Zweibrucken; Herbert Baltes, Losheim, both of Fed. Rep. of Germany

[73] Assignee: Hydac Technology GmbH, Fed. Rep. of Germany

[21] Appl. No.: 335,317

[22] Filed: Apr. 10, 1989

[30] Foreign Application Priority Data

Apr. 15, 1988 [DE] Fed. Rep. of Germany ....... 3812552

[51] Int. Cl.⁵ ............................................ F16K 17/40
[52] U.S. Cl. ..................................... 137/72; 137/79; 220/89 B
[58] Field of Search .................... 137/72, 79; 220/89 B

[56] References Cited

U.S. PATENT DOCUMENTS

| | | |
|---|---|---|
| 1,920,647 | 8/1933 | Lake ....................................... 137/72 |
| 2,461,940 | 2/1949 | Sundstrom ........................... 220/89 B |
| 4,006,780 | 2/1977 | Zehr ...................................... 137/72 |
| 4,059,125 | 11/1977 | Sugimura et al. ................... 220/89 B |
| 4,099,538 | 7/1978 | Curtis .................................... 137/73 |
| 4,352,365 | 10/1982 | Boccardo ............................ 220/89 B |
| 4,365,643 | 12/1982 | Masclet et al. ........................ 137/72 |

FOREIGN PATENT DOCUMENTS

| | | |
|---|---|---|
| 2704961 | 8/1978 | Fed. Rep. of Germany . |
| 2744898 | 4/1979 | Fed. Rep. of Germany . |
| 1342740 | 1/1974 | United Kingdom ................. 137/72 |

Primary Examiner—John Rivell
Assistant Examiner—L. R. Leo
Attorney, Agent, or Firm—Roylance, Abrams, Berdo & Goodman

[57] ABSTRACT

A melting safety device for discharging gas from the gas system of a hydropneumatic pressure reservoir or accumulator has a blocking element of a material which melts when exposed to an undue temperature increase. A normally closed valve can be opened by a control member which is prebiased for controlled movement by the force of a power drive. The blocking element is a mechanical blocking member which blocks the controlled movement of the control member prior to its melting, but permits the controlled movement of the control member upon melting.

5 Claims, 1 Drawing Sheet

MELTING SAFETY DEVICE FOR GAS SYSTEM OF HYDROPNEUMATIC PRESSURE ACCUMULATORS

FIELD OF THE INVENTION

The present invention relates to melting safety devices for discharging gas from the gas system of a hydropneumatic reservoir or accumulator upon being exposed to heat above a predetermined temperature.

BACKGROUND OF THE INVENTION

Melting safety devices of this type are already known and prevent undue pressure build-up in the gas system. For instance, in case of a fire, a material is selected for a blocking element, which material has a melting temperature in the range of up to about 220 degrees C. This material can be a tin alloy, such as is used commercially as a tin solder with a suitably low melting point. An opening for the discharge passage is located at a point which differs from the surrounding temperature. The gas can escape from the system through such discharge point. The discharge point is sealed by means of a soldered joint produced with the type of tin solder having a desirable melting point.

One disadvantage in this conventional melting safety device is that for the high operational pressures which will prevail, which pressures can be in the range of 500 bar or higher in pressure accumulators, critically high requirements must be satisfied in forming the solder connection. Since the solder connection will be continuously subjected to the operational pressure, the connection must be produced with great care and must be free of pores, in order to preclude any losses of pressure from the system. It is especially important that the solder diffuses somewhat, because it is continually under pressure.

With increasing temperatures, the rising pressure is generally outward, until the pressure opens the discharge passage. Another disadvantage of many known systems involves the difficulty in working with the melting safety device. For instance, to modify the control temperature, the entire gas system must be made pressureless with conventional safety devices.

SUMMARY OF THE INVENTION

An object of the present invention is to provide a safety device for controlling discharge of gas from a gas system of a hydropneumatic pressure accumulator which can reliably withstand relatively high pressures.

Another object of the present invention is to provide a safety device for controlling discharge of gas from a gas system of a hydropneumatic pressure accumulator which is simple and inexpensive to manufacture and install.

A further object of the present invention is to provide a safety device for controlling discharge of gas from a gas system of a hydropneumatic pressure accumulator in which the temperature responsive element can be changed without depressurizing the accumulator.

The foregoing objects are obtained by a safety device for controlling discharge of gas from a gas system, particularly of a hydropneumatic pressure accumulator, comprising a discharge passage, and a normally closed first valve positioned in and controlling fluid flow through the discharge passage. A control member is mounted adjacent the first valve for movement along a path between a rest position in which the control member is operationally disengaged from the first valve allowing the first valve to remain closed and a operative position in which the control member engages the first valve forcing the first valve open. Power means, coupled to the control member, moves the control member from the rest position to the operative position. A blocking member projects into the path of movement of the control member and releasably retains the control member in the rest position. The blocking member is formed of a material that melts upon exposure to an unexpected temperature increase. Upon melting of the blocking member, the power means moves the control member to the operative position opening the first valve and the discharge passage.

By forming the safety device according to the present invention, the discharge passage is normally closed by a maneuverable valve. The blocking member blocks a controlled movement of the control member which opens the first valve upon moving. The control member is pre-biased by the power means. Thus, the gas-tight closing of the discharge passage is independent of whether the blocking member functions as a seal or does not. This member need only block the controlled movement of the control member for opening the first valve mechanically for so long as the critical temperature increase has not occurred for the discharge passage to be opened. Upon the melting of the blocking member, control member is freed so that, under the effect of the power means, the control member carries out its controlled movement opening the valve.

Since the control of the flow through the discharge passage is carried out in the present invention by the normally closed first valve, work can be performed on the blocking member and on the first valve operating mechanism cooperating with the blocking member without the pressure system going without pressure or being depressurized. Without any escape of compressed gas, the blocking member can be replaced for modification of the critical temperature.

In one advantageous exemplary embodiment, the equipment is arranged so that the blocking member is configured also as a sealing element of a second valve. The second valve is normally closed, controls the opening of the discharge passage, is connected in series with the primary or first valve, and opens as a result of the melting of the blocking member. This exemplary embodiment has an especially high operational security. In normal circumstances when the blocking member is not melted, the second valve holds the gas system pressure-tight as an additional security measure against loss of pressure, even when the normally closed primary or first valve may be out of commission.

The blocking member can be configured in the form of a washer, and can function as a support for a sealing ring engaging on it or a support for one sealing ring of the second valve. The second valve can be configured as a doughnut disk plate valve, engaging on each side of the blocking member. An especially simple and compact structure is thus attained.

The power means cooperating with the control element for opening the first valve can be a spring arrangement.

If the first valve is positioned in a central bore extending axially or longitudinally of a circular cylindrical valve member, a cap nut can be provided as a spring housing for the spring arrangement. The spring arrangement can be configured as a set of cup springs.

The cap nut can be connected by a screw coupling with the end area of the valve member which is adjacent to it, and can guide the pressure plate of the control member being acted upon by the set of springs for the controlled longitudinal movement. The pressure plate can have a central pin projecting axially from it which acts on a valve shaft of the first valve when the power means and control member are not blocked by the blocking member.

In an exemplary embodiment, the equipment can be arranged so that the control member pressure plate functions as a valve plate of the second valve, which is configured as a doughnut disk plate valve and is supported by a sealing ring of the doughnut disk plate valve on the blocking member configured as a washer element. When the blocking element is not melted, this arrangement blocks the control movement of the pin of the pressure plate which extends down toward the valve shaft.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENT

Figures 1, 2:
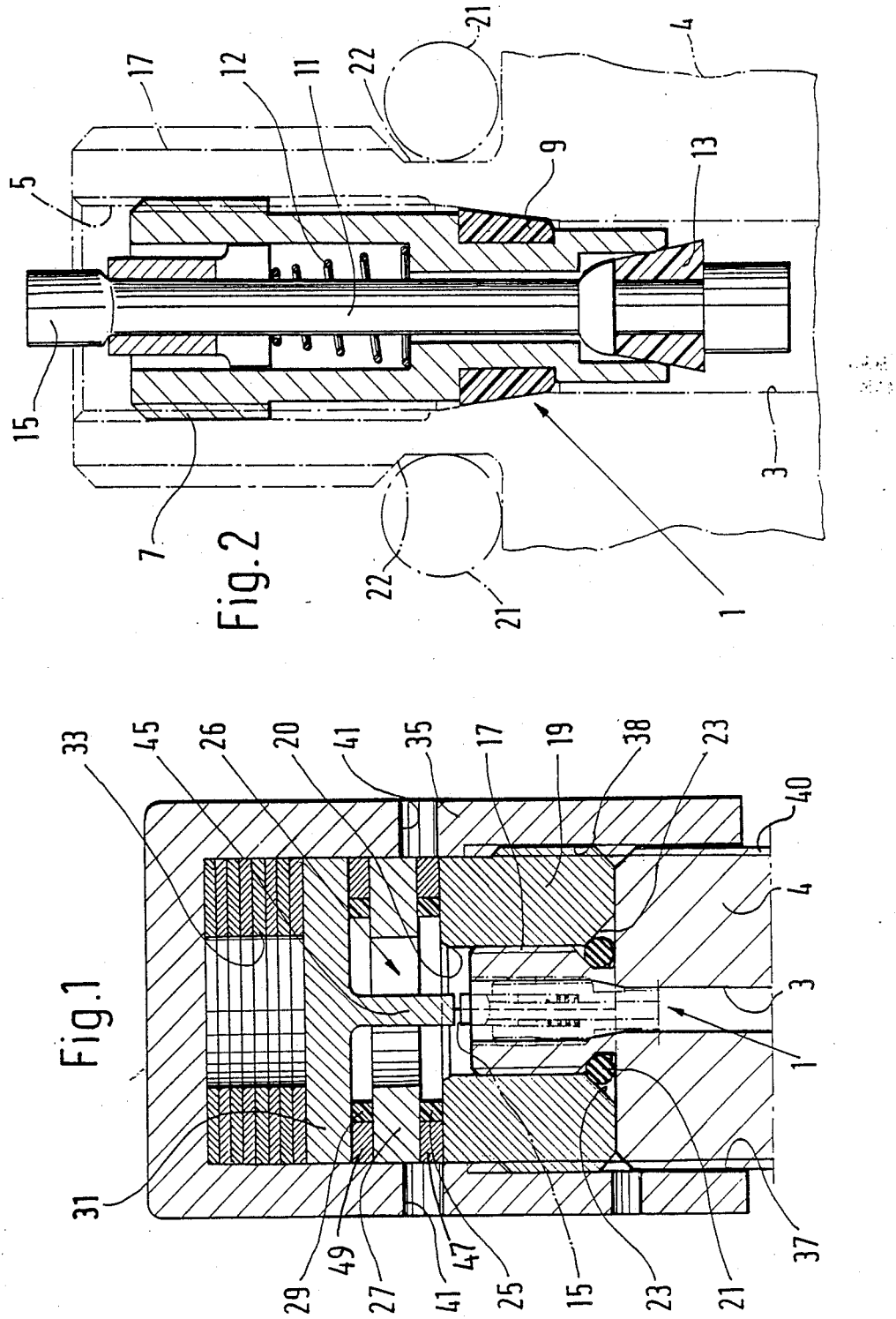
FIG. 1 is a partial side elevational view in longitudinal section of a melting safety device according to one embodiment of the present invention.
FIG. 2 is an enlarged side elevational view in longitudinal section of the first gas valve of the melting safety device of FIG. 1 with its valve member shown in dot-dash lines.

A gas valve 1 is shown in the enlarged view of FIG. 2. The gas valve is positioned in a central bore 3 extending axially or longitudinally through a circular valve member 4. Valve member 4 is prevulcanized onto the bladder forming the gas chamber of a conventional hydropneumatic pressure accumulator or reservoir. However, the present invention also can be used for other pressure accumulators or reservoirs.

For the fastening gas valve 1 in the end segment of valve member 4 turned away from the bladder, the through-passage bore 3 of valve member 4 has a widened segment with an inside thread 5 (FIG. 2). The gas valve 1 is screwed into the widened segment by means of its outside thread 7. Gas valve 1 is sealed against the inside wall of bore 3 by means of a sealing gasket 9 having a wedge-shaped cross section.

Gas valve 1 is of traditional or conventional construction, and has a longitudinally or axially movably supported central valve shaft 11. Shaft 11 is pre-biased by a valve spring 12 so as to be normally held in a closed position in which a conical valve poppet 13 of flexible sealing material tightly closes off the inside passage of the gas valve. Gas valve 1 is opened by axial displacement of shaft 11 against the force of spring 12. A corresponding controlling displacement force is exerted on its shaft end 15 shown at the top of the drawing of FIG. 2.

Valve member 4 has a reduced outside diameter and an outside thread 17, in its end segment associated with the gas valve, i.e., opposite the end associated with the bladder of the pressure reservoir. The not tapered or larger diameter segment of valve member 4 engages the reduced sized end segment, and carries an outside thread 40, onto which can be screwed a cap nut 35 by means of its inside thread 37.

An annular bushing 19 with an outside thread 38 is screwed into the inside threaded segment of inside thread 37 of cap nut 35. The inside bore 20 of bushing 19 is configured as a hexagon, and receives the reduced sized end segment of valve member 4 with its outside thread 17, when cap nut 35 is screwed on valve member 4. With its inside bore 20, threaded bushing 19 forms a portion of the discharge passage which is normally closed by gas valve 1. The discharge passage extends from the gas bladder, through bore 3 of valve member 4, through the inside passage of the normally closed gas valve 1 and through bore 20 of threaded bushing 19. Bore 20 of threaded bushing 19 is sealed at its contact with valve member 4 by an O-ring 21. O-ring 21 rests in a channel 22 in the connection between the reduced end segment of valve member 4 with its outside thread 17 and its larger end segment, and cooperates with oblique sealing surface 23 (FIG. 1) on the associated end area of threaded bushing 19.

The active surface of threaded bushing 19, opposite oblique sealing surface 23, is provided as a flat, horizontal sealing surface. The threaded bushing active surface engages a sealing ring 25 which is a part of the doughnut disk plate second valve, indicated in its entirety as 26, through which passes the discharge passage for the gas. The doughnut disk plate second valve 26 is connected in series relative to gas valve 1. The second valve includes washer 27 engaging the side of sealing ring 25 remote from the threaded bushing 19. The washer is formed of a low melting point tin solder. In the exemplary embodiment the tin solder is an alloy with a melting temperature in the range of about 160° C. to 170° C.

On the side of washer 27, opposite sealing ring 25, the second valve 26 has another sealing ring 29. Sealing rings 25 and 29 are surrounded on their peripheries by spacer rings 47 and 49, respectively. Pressure plate 31 acts upon sealing ring 29 and spacer ring 49 to exert pressure on washer 27 for the purpose of pressing sealing ring 25 and spacer 47 against the adjacent front surface of threaded bushing 19 under the spring force of a prebiased set of cup springs 33. The bias of cup springs 33 can be established with the aid of a hexagonal key inserted into the inside of hexagonal bore 20, thereby controlling or setting the position of bushing 19 in cap nut 35.

Pressure plate 31 is a round plate. The outside diameter of pressure plate 31 is fitted to the inside diameter of cap nut 35 so that, with its slide capacity, it is guided to slide along the inside wall of cap nut 35. The spring force of cup springs 33, with this particular arrangement, provides the closing force of doughnut disk plate valve 26. Such spring force is transferred from cup springs 33 through pressure plate 31 and sealing ring 29 to washer 27, which washer is of easily melting material.

Doughnut disk plate valve 26 forms one structural unit together with cap nut 35 and threaded bushing 19 screwed into the cap nut. Second valve 26 is therefore normally closed, the same as gas valve 1.

The threaded connection between cap nut 35 and threaded bushing 19 can be made more secure by applying an adhesive between the two parts. This threaded connection between cap nut 35 and valve member 4 permits the cap nut to be detached together with threaded bushing 19 without modification of the spring bias of valve member 4, facilitating the exchange of the entire melting safety device for another device with a different melting temperature.

The side wall of cap nut 35 is interrupted in the area adjacent to washer 27 by bores 41. Bores 41 form the discharge end of the gas discharge passage. When the surrounding temperature rises to a level at which washer 27 melts, the force of cup springs 33 move pressure plate 31 in the direction of threaded bushing 19 and gas valve 1. The molten washer 27 no longer provides resistance to the spring thrust of cup springs 33.

A pin 45 is formed as an integral part of pressure plate 31 and extends centrally and axially from pressure plate 31. Pin 45 is moved together with the plate as one monoblock member into a central position where it engages shaft end 15 of valve shaft 11, and moves shaft 11 so that gas valve 1 is opened against the thrust of its valve spring 12. After the sealing effect of doughnut disk plate valve 26 has been neutralized by the melting away of washer 27 and gas valve 1 is opened by the controlled movement of pin 45, the melted material of washer 27 is discharged through bores 41 in cap nut 35. Also, the gas discharge passage is opened so that the gas can flow out through bore 3 of valve member 4, the opened gas valve 1, bore 20 of threaded bushing 19 and the opened doughnut disk plate valve 26. Second valve 26 is opened when there is no longer support provided by sealing ring 25 and 29, which are formed to support molten washer 27. In other words, valve 26 is opened when there is no longer a support of the sealing rings 25 and 29 forming the valve seat ring.

During operation, cap nut 35 can be removed by unscrewing it from valve member 4, without the gas being released from the gas chamber of the bladder. Even when cap nut 35 and doughnut disk plate valve 26 are removed, gas valve 1 still seals off the gas system tightly. Without hindrance from the presence of the safety device then, gas valve 1 can serve as fill-up valve for the gas chamber. After subsequent repeated screwing on of cap nut 35 with the components of the doughnut disk plate valve 26 mounted therein, as well as the associated power spring operation of gas valve 1, the melting safety function is still guaranteed. The discharge passage is closed and sealed tightly not only by gas valve 1, but also by the normally closed doughnut disk plate valve 26.

Instead of washer 27, a closed disk or plate with a central bore facilitating the passage of pin 45 could also be used.

While a particular embodiment has been chosen to illustrate the invention, it will be understood by those skilled in the art that various changes and modifications can be made therein without departing from the scope of the invention as defined in the appended claims.

What is claimed is:

1. A safety device for controlling discharge of gas from a gas system, particularly of a hydropneumatic pressure accumulator, comprising:
   a discharge passage;
   a normally closed first valve positioned in and controlling fluid flow through said discharge passage;
   a control member mounted adjacent said first valve for movement along a path between a rest position in which said control member is operationally disengaged from said first valve allowing said first valve to remain closed and an operative position in which said control member engages said first valve forcing said first valve open;
   power means, coupled to said control member, for moving said control member from the rest position to the operative position;
   a blocking member projecting into the path of movement of said control member and releasably retaining said control member in the rest position, said blocking member being formed of a material that melts upon exposure to an unexpected temperature increase; and
   a normally closed second valve arranged in said discharge passage adjacent said blocking member in series with said first valve, said second valve having a sealing element and being opened upon melting of said blocking member;
   whereby, upon melting of said blocking member, said power means moves said control member to the operative position opening said first valve and said discharge passage.

2. A safety device according to claim 1 wherein
   said blocking member comprises a washer which is part of said second valve;
   said second valve also comprises an annular disk plate valve having at least one sealing ring forming a valve seat ring, said sealing ring being mounted on said washer; and
   said control member comprises a valve pressure plate which transmits pressure from said power means and restricts movement of said washer and said sealing ring.

3. A safety device according to claim 2 wherein
   said first valve comprises an axially movable valve shaft; and
   said control member comprises a central operating pin extending generally perpendicular from said valve pressure plate and through said washer, said pin being held by said washer against said power means at a distance from said valve shaft and being axially slidable by said power means upon melting of said washer to engage and move said valve shaft opening said first valve.

4. A safety device according to claim 3 wherein
   said first valve comprises a central axial bore defining a portion of said discharge passage and is mounted in a valve member though which said discharge passage extends, said valve member having an outside thread supporting a nut cap housing said power means;
   said power means comprises springs supported at one end on a inside base of said nut cap and at an opposite end on said valve pressure plate, said valve pressure plate being guided for movement along an inside wall surface of said cap nut.

5. A safety device according to claim 4 wherein said springs comprise cap springs.

* * * * *